Figure 3:
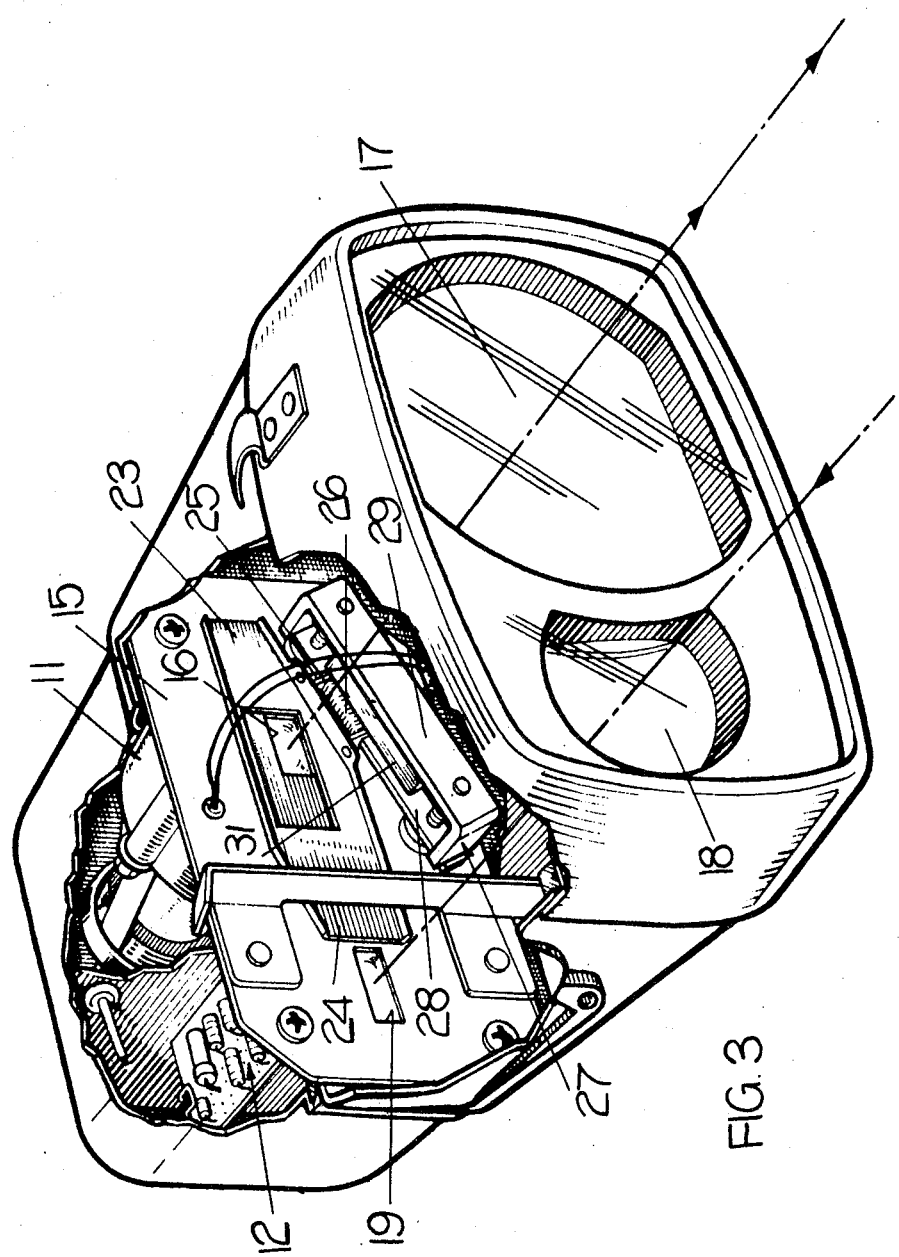

United States Patent [19]
Hicks

[11] 3,743,885
[45] July 3, 1973

[54] ROAD VEHICLE LIGHTING SYSTEMS

[75] Inventor: Harris Vernon Hicks, Lichfield, England

[73] Assignee: Joseph Lucas (Industries) Limited, Birmingham, England

[22] Filed: Sept. 15, 1971

[21] Appl. No.: 180,815

[30] Foreign Application Priority Data
Sept. 18, 1970 Great Britain.................... 44,604/70

[52] U.S. Cl. ................................................. 315/82
[51] Int. Cl. .............................................. B60q 1/08
[58] Field of Search................................. 315/82, 87

[56] References Cited
UNITED STATES PATENTS

| | | | |
|---|---|---|---|
| 3,617,795 | 11/1971 | Peek | 313/117 |
| 2,753,487 | 7/1956 | Bone | 315/82 |
| 2,917,666 | 12/1959 | Engelmann et al. | 315/83 |
| 3,341,700 | 9/1967 | Finch | 315/83 X |

FOREIGN PATENTS OR APPLICATIONS

| | | | |
|---|---|---|---|
| 1,098,608 | 1/1968 | Great Britain | 315/82 |

*Primary Examiner*—Roy Lake
*Assistant Examiner*—James B. Mullins
*Attorney*—Holman & Stern

[57] ABSTRACT

A road vehicle lighting system has a first projector-receiver unit wherein the projected light beam can be cut off from the left-hand side and a second projector receiver unit wherein the projected light beam can be cut off from the right-hand side. The first and second units are mounted at the right hand and left-hand side of the vehicle respectively and there are a pair of light sources mounted at the left and right-hand side of the vehicle respectively. This overall arrangement produces an improved light pattern in the front of the vehicle.

4 Claims, 14 Drawing Figures

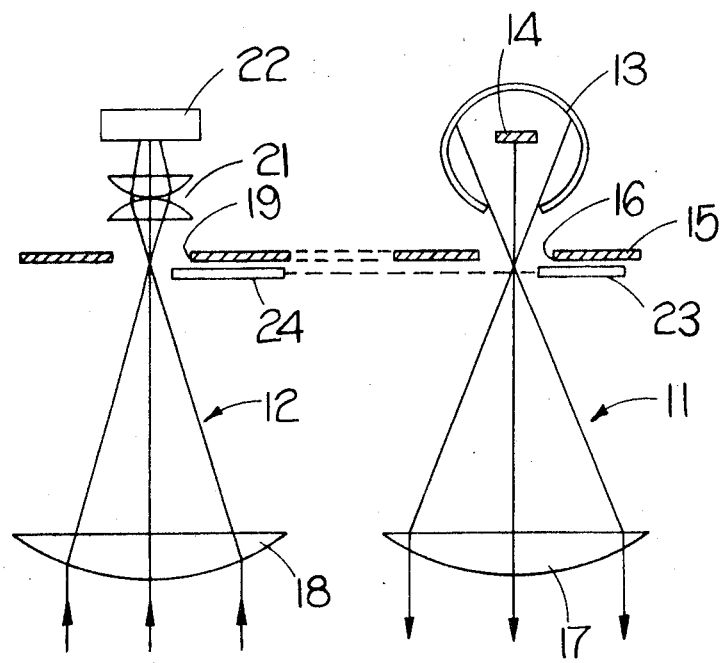

ROAD VEHICLE LIGHTING SYSTEMS

This invention relates to road vehicle lighting systems.

The term projector-receiver unit is used herein to denote a unit including a light projector for projecting forwardly a well defined, divergent beam of light of generally rectangular cross section, a light receiver for receiving light from a light source in front of the unit, and means responsive to light received by the receiver for cutting off sufficient of the projected beam, from one side of the beam, to ensure that the beam does not fall on said light source.

A road vehicle lighting system according to the invention includes a first projector-receiver unit wherein the projected light beam can be cut off from the left side thereof, mounted on the right of the front of the vehicle to project its beam forwardly of the vehicle, a second projector-receiver unit, wherein the projected light beam can be cut off from the right side thereof, mounted at the left of the front of the vehicle to project its beam forwardly of the vehicle, and a pair of light sources, mounted respectively at the left and right of the front of the vehicle.

Preferably said first and second units are arranged so that the optical axes of their projected beams diverge slightly from the longitudinal centre line of the vehicle, while ensuring that the beams at their maximum width overlap. Conveniently the optical axes of the beams diverge 2° from the centre line of the vehicle and each beam has an 11° lateral spread so that the field of the two beams is 15°.

Desirably the first unit and the right light source are mounted side by side with the light source adjacent the right side of the vehicle, and the left light source and the second unit are mounted side by side with the light source adjacent the left side of the vehicle.

Figure 4:
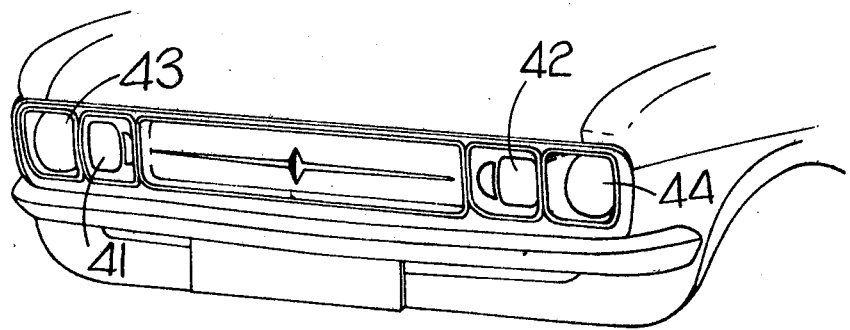
Figure 5:
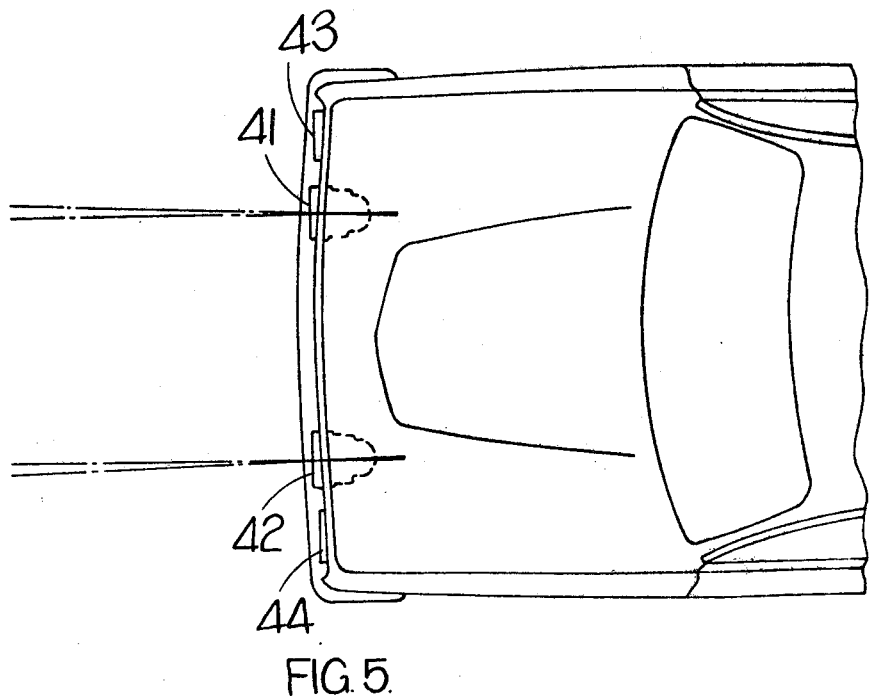
Figure 12:
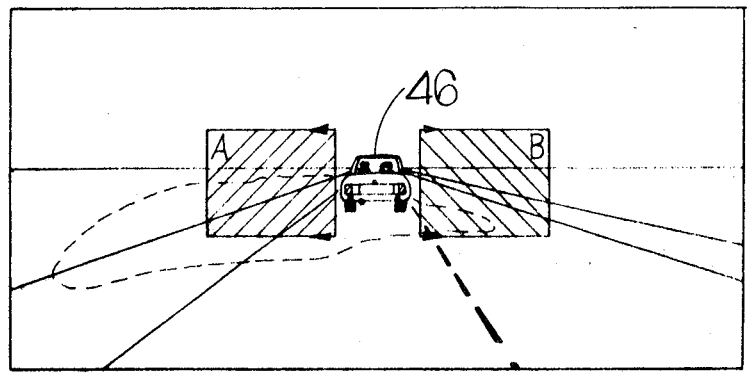
Figure 13:
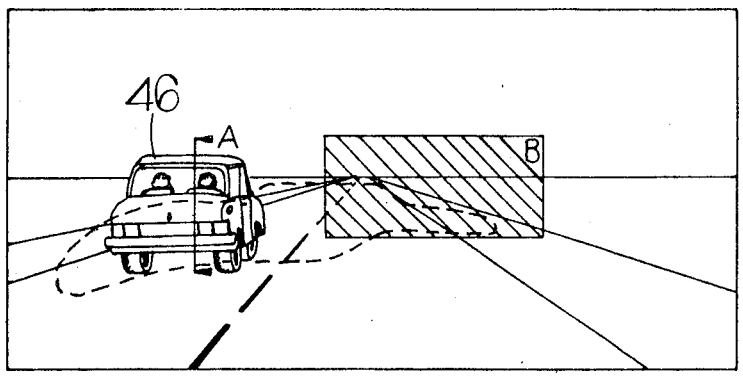
Figure 14:
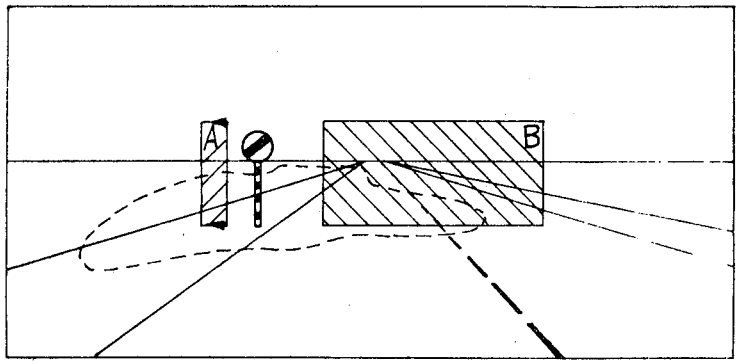

One example of the invention is illustrated in the accompanying drawings wherein FIGS. 1 and 2 are optical diagrams respectively of the projector and receiver of a projector-receiver unit, FIG. 3 is a diagrammatic representation of a projector-receiver unit, FIG. 4 is a perspective view of the front of a road vehicle equipped with a pair of projector-receiver units, FIG. 5 is a plan view of the vehicle shown in FIG. 4, FIGS. 6 to 11 illustrate the operation of said one example of the invention in a situation where a vehicle approaches the vehicle equipped with the system, FIGS. 12 and 13 show the operation of said one example of the invention during over-taking a vehicle travelling in the same direction as the vehicle equipped with the system, and FIG. 14 illustrates the operation of said one example of the invention when the vehicle equipped with the system is passing a stationary, reflective road sign.

Referring first to FIGS. 1, 2 and 3 of the drawings, each projector-receiver unit includes a casing housing a light projector 11 and a light receiver 12. The projector 11 includes a high intensity bulb, having a part elipsoidal mirror 13 associated therewith. The filament 14 of the bulb is positioned at one focus of the mirror 13, and the bulb is so positioned that the other focus of the mirror 13, occurs in an aperture 16 of a mask 15. Positioned on the side of the mask 15 remote from the bulb is a plano-convex lens 17 the spacing between the lens 17 and the mask 15 being equal to the focal length of the lens 17. The aperture 16 is rectangular, and so a well defined image of the aperture 16 is projected forwardly to constitute a divergent beam of light of accurately rectangular cross section. Thus when the unit is positioned on the front of a road vehicle, then the beam of light illuminates the road in front of the vehicle.

The receiver 12 includes a plano-convex lens 18 which receives light from in front of the receiver, and which produces an image in a rectangular aperture 19 in the mask 15. Light passing through the aperture 19 falls on a condensor lens system 21 which directs the light onto the sensitised surface of a photo cell 22. The arrangement is such that an image of the lens 18 falls on and almost fully covers the sensitised surface of the photocell 22. In this way, the image of the lens 18 falls centrally on the photo cell 22 irrespective of the position of the image in the aperture 19. If the image falls outside the aperture 22, no light falls on the cell.

Movable across the apertures 16, 19 respectively are a pair of shutters 23, 24 which are interconnected so as to move simultaneously. In practice, the shutters 23, 24 are integral with one another. The shutters 23, 24 are carried by a spool 25 which also carries a winding 26. Extending through the spool 25 is one limb 28 of a rectangular soft iron frame 27. The limb 29 of the frame 27 opposite the limb 28 has secured thereto a ferrite magnet 31, the magent 31 being housed between the limbs 28, 29 and the width of the magnet 31 being substantially equal to the length of the limb 29. The north pole of the magnet 31 is in contact with the limb 29 and since the frame 27 is a closed circuit then the whole of the frame 27 is of north polarity with respect to the south pole of the magnet 31. The south pole of the magnet 31 is spaced from the limb 28 of the frame 27 by an air gap, and so part of the magnetic field of the frame 27 and magnet 31 extends between the limb 28 and the south pole of the magnet 31 at right angles to the limb 28. The winding 26 is wound around the spool 25, and so the limb 28 passes through the winding.

Electrical connections are made to the winding 26 by way of fine copper pig-tails and the spool 25 can slide along the limb 28. The frame 27 is inclined and so the spool 25, and consequently the shutters 23, 24 are urged by gravity when the system is switched off towards one end of the limb 28. The frame 27 is so inclined that the shutters are urged to a position wherein the apertures 16, 19 are covered by the shutters.

In use when light falls on the photocell 22, the resistance of the photocell 22 is changed producing a current which is amplified and which is supplied to the winding 26. As electrical current flows in the winding 26 in response to light falling on the photocell the spool 25 will be caused to move longitudinally along the limb 28 of the frame 27 from a rest position wherein the apertures are uncovered towards a position where the apertures are covered. The shutters 23, 24 move in a direction to progressively cover their respective apertures 16, 19 and the shutters 23, 24 continue to move, until the leading edge of the shutter 24 covers that portion of the aperture 19 in which the image of the light source (e.g. headlamps of an oncoming vehicle) falling. When this position is reached the photo cell 22 produces a reverse output, and the spool and shutters are moved in the opposite direction, whereupon the photocell again produces an output. Thus the shutters 23, 24 and the spool 25 hunt about a position wherein the leading edge of the shutter 24 masks the image of the light source falling in the aperture 19. The amplifier of the unit is so designed as to provide some measure of damping, and if required mechanical damping can also be provided. While the shutter 24 is masking part of the aperture 19, the shutter 23 will of course be masking part of the aperture 16 and since the width of the projected beam of light is dependent upon the width of the apertures 16, then the position of the shutter 23 relative to the aperture 16 will determine the width of the projected beam. Thus as the shutter 23 moves across the aperture 16 the projected beam will be progressively cut off from one side of the beam. The correlation between the projector 11 and the receiver 12 is such that sufficient of the projected beam is cut off to ensure that the projected beam does not fall on the light source seen by the receiver. In the case where the light source seen by the receiver is the headlights of an oncoming vehicle, then the projected beam will be cut off sufficiently to prevent the beam falling on the driver of the oncoming vehicle, thereby minimising the risk that the driver of the oncoming vehicle will be dazzled. The spool 25 is urged towards its rest position by a signal generated when no light falls on the photo cell so that when no light falls on the photo cell the apertures 16, 19 are uncovered. When the system is switched off, the inclination of the frame 27 causes the shutters to move under gravity to cover their respective apertures.

It will be appreciated that the shutters 23, 24 can be so arranged that the projected beam is cut off from either side thereof, that is to say the projected beam can be cut off from its left side, in one unit, while in a second unit the arrangement can be such that the beam is cut off from its right side.

Referring now to FIGS. 4 and 5, a road vehicle is provided with a lighting system including a pair of projector-receiver units 41, 42. In addition, the vehicle is provided with a pair of headlamp units 43, 44 which are set to a dipped beam condition. The unit 41 and the headlight 43 are disposed side by side at the right side of the front of the vehicle, with the headlight 43 closer to the right side of the vehicle than the unit 41. Similarly, the unit 42 and the headlight 44 are disposed side by side at the left side of the front of the vehicle with the headlight 44 closer to the extreme left side of the vehicle than the unit 42. The unit 41 is so arranged that its projected beam will be cut off from the left side thereof in response to light received by the receiver of the unit 41, and the unit 42 is so arranged that its beam will be cut off from the right side thereof in response to light received by the receiver of the unit 42. The maximum spread of the beam of each of the units 41, 42 is 11°, and the units 41, 42 are so arranged that the optical axis of their projected beams each diverge by 2° from the longitudinal centre line of the vehicle. Thus when both the units 41, 42 are operating with their beams at maximum spread then the spread of illumination from both beams is a total of 15°, 7½° on either side of the longitudinal centre line of the vehicle. The two beams in this condition, overlap through 7°, 3½° on either side of the centre line of the vehicle. The operation of the lighting system of the vehicle when faced with an oncoming vehicle while approaching a left hand bend will now be described with reference to FIGS. 6 to 11 which show the operation in sequential steps.

Figure 6:
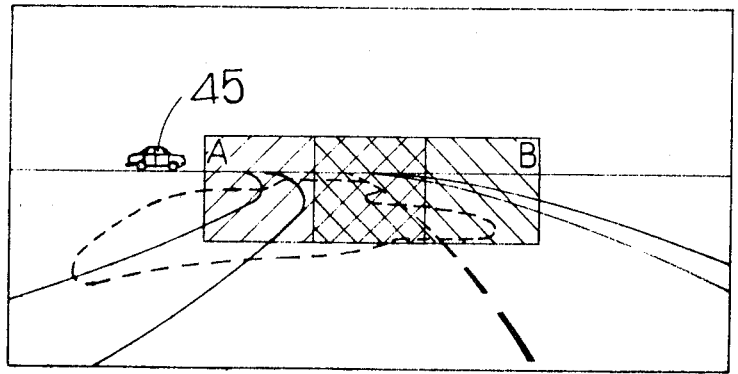
Figure 7:
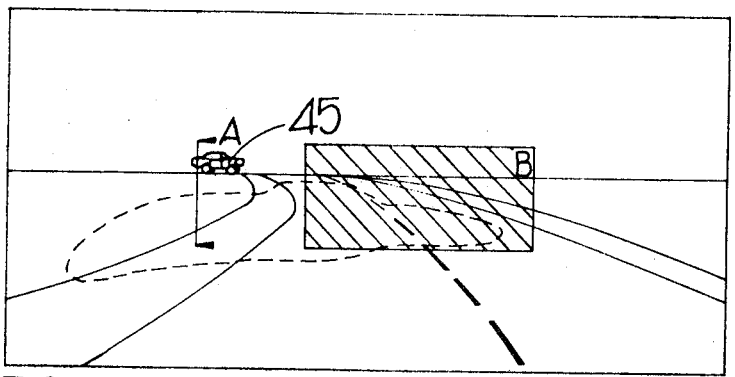
Figure 8:
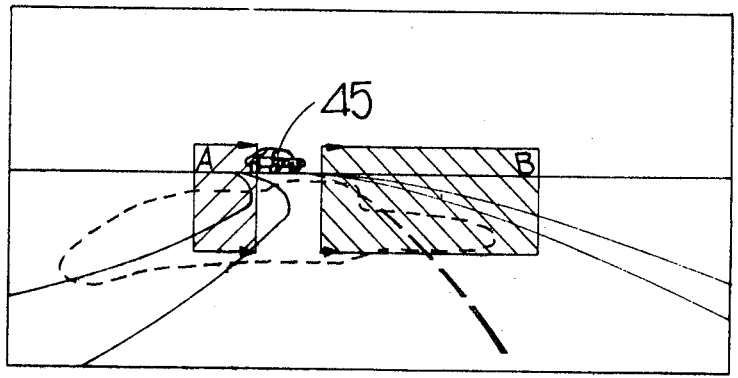
Figure 9:
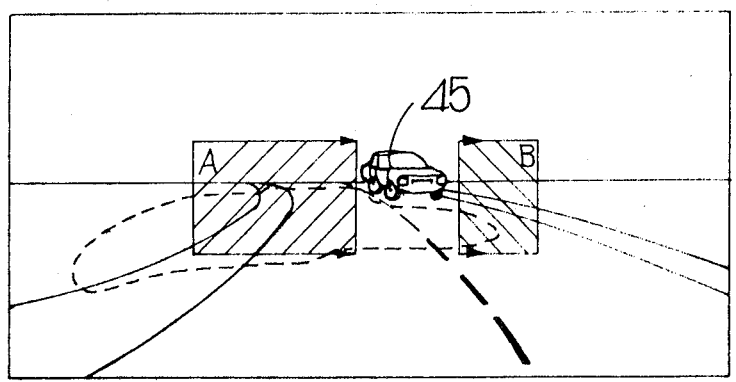
Figure 10:
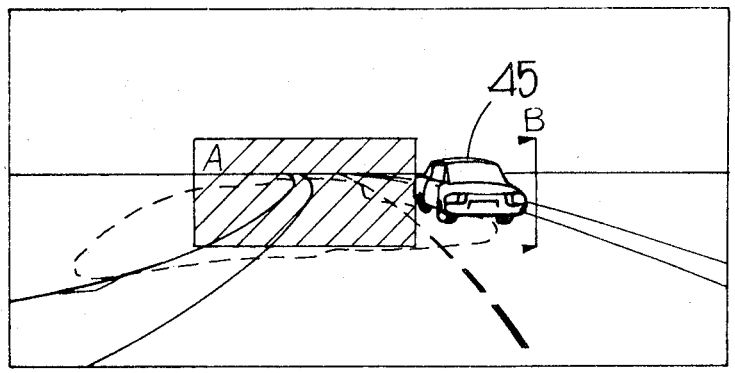
Figure 11:
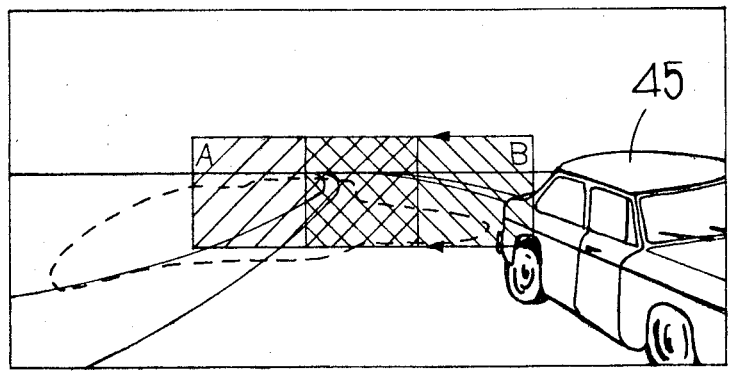

FIG. 6 shows the full spread of beams $a$ and $b$ from the units 42, 41 respectively, both beams being at maximum spread, since the lights of the oncoming vehicle 45 fall outside the ranges of the receivers of both of the units 41, 42. Since the vehicle equipped with the system is approaching the left turn then the lights of the vehicle 45 will fall first in the field of view of the receiver of the unit 42. Since the beam $a$ of the unit 42 is cut off from the right side thereof then immediately the lights of the vehicle 45 fall within the field of view of the receiver of the unit 42 then the beam $a$ will be completely cut off (FIG. 7). As the vehicle 45 progresses to the right with respect to the vehicle equipped with the system beam $a$ will be gradually increased in width from zero as the lights of the vehicle 45 progress across the field of view of the receiver of the unit 42 (FIG. 8). Since the beams $a$ and $b$ overlap, then of course the fields of the receivers of the units 41, 42 overlap, and so before beam $a$ reaches its maximum width the lights of the vehicle 45 will enter the field of view of the receiver of unit 41, and beam $b$ will be narrowed from the left side thereof so that beam $b$ does not fall on the driver of the vehicle 45 (FIG. 9). The units 41, 42 will continue to operate in this manner until the lights of the vehicle 45 leave the field of view of the unit 42 whereupon beam $a$ will be at its maximum width, and thereafter until the lights of the vehicle 45 reach the extreme right of the field of view of the unit 41 whereupon the beam $b$ will be completely cut off (FIG. 10). Immediately the lights of the vehicle 45 leave the field of view of the unit 41 then the beam $b$ will immediately widen to its fullest extent (FIG. 11) so that the maximum field of illumination of the combined beams $a$ and $b$ is once again established. Thus it will be appreciated that throughout the sequence of operation of the units 41, 42 as the vehicle 45 approaches neither of the beams $a$, $b$ falls on the driver of the vehicle 45, and so the risk of dazzling of the driver of the vehicle 45 is minimised. However, the maximum amount of the 15° field of illumination of the units 41, 42 is maintained, so that the driver of the vehicle equipped with the system sees as much as possible of the road ahead. The cut off of the beams $a$, $b$ is extremely accurate, and so during part of the approach the vehicle 45 will be travelling in a channel of darkness between two channels of illumination. The accuracy of the cut off of the beams $a$, $b$ ensures that the risk of dazzling of the driver of the oncoming vehicle is kept to a minimum. In FIGS. 6 to 11 the dotted enclosure indicates the field of illumination of the dipped beam headlamps 43, 44.

Turning now to FIGS. 12 and 13 wherein the sequence of operation of the units 41, 42 during overtaking a vehicle travelling in the same direction, is shown. The receivers of the units 41, 42 are sufficiently sensitive to be operated by the rear lights of a vehicle within the range of illumination of the beams $a$, $b$. Thus as the vehicle equipped with the system approaches the rear of the vehicle 46 to be overtaken, both beams $a$ and $b$ are cut off simultaneously, beam $a$ being cut off from its right side and beam $b$ being cut off from its left side, to leave a channel of darkness within which the vehicle 46 lies. The beam $a$ illuminates the road, and the side of the road to the left of the vehicle 46 and the beam $b$ illuminates the road, and the side of the road to the right of the vehicle 46 but neither of the beams impinges upon the vehicle 46, and so there is little risk of the driver of the vehicle 46 being dazzled by way of his rear view mirror. As the vehicle equipped with the lighting system moves to the right of the road to overtake the vehicle 46, then the beam $b$ widens up to its maximum, and the beam *a* is closed completely as the rear lights of the vehicle 46 reach the extreme left of the field of view of the unit 42. Thus as the vehicle equipped with the system overtakes the vehicle 46 the beam *b* affords long range illumination of the road in front of the vehicle 46, and to the right of the vehicle 46 without dazzling the driver of the vehicle 46.

FIG. 14 illustrates the operation of the lighting system when the vehicle equipped with the system passes a highly reflective road sign. The unit 42 in this case being operated by light emanating from the headlights 43, 44 and being reflected back to the unit by the road sign.

In order that the units 41, 42 shall not be operated unduly by reflection of their own projected beams, the photo cell of each of the units is chosen to be principally sensitive to the red and infra-red wavelengths of light. Filtering means is provided in each of the projectors for removing the red and infra-red wavelengths on the projected beams. Thus back reflection of the projected beams from for example a reflective road sign will not cause operation of the units to reduce the width of their projected beams unduly. Conveniently the filtering means is in the form of a dichroic coating on the reflector of each of the projector bulbs. The dichroic coating permits the red and infra-red wavelengths to pass through the reflector, while the remaining wavelengths are reflected to constitute the projected beam. It will be appreciated that since the normal headlamps of a vehicle still contain red and infra-red wavelengths, then the units will be operated by the lights of the oncoming vehicle. For this reason it is desirable that a vehicle equipped with the units 41, 42 has some form of conventional light source, in this example dipped headlamps 43, 44, so that if the oncoming vehicle is equipped with units 41, 42 as well, then the units 41, 42 of the oncoming vehicle will be operated by the light source is constituted by the headlamp units 43, 44.

Each projector-receiver unit described above is capable of cutting off its projected beam only in one direction, and so to provide a first unit wherein the beam is cut off from the left side, and a second unit wherein the beam is cut off from the right side, it is necessary to build two differing units. In a modification, the spool 25 which carries the shutters 23, 24 described above, carries a shutter assembly consisting of three shutters. The centre shutter of the three shutters is positioned between the apertures 16, 19, and the two outer shutters are positioned at the extreme right side of the aperture 16 and at the extreme left side of the aperture 19 respectively. The frame 27 is so positioned that the centre shutter of the three shutters can be moved sufficiently far in either direction to co-operate with the aperture 16 or the aperture 19, depending on the direction of movement of the spool 25. Thus it will be appreciated that utilising such a modified unit, then only one type of unit need be manufactured, merely the electrical polarity of the winding 26 determining whether the projected beam of the unit is cut off from the right side, or the left side thereof.

In either of the arrangements described above it is preferable that the receiver aperture 19 is slightly longer, and wider, then the projector aperture 16 so that irrespective of the angle of approach of the oncoming vehicle the shutters will be moved sufficiently to avoid dazzling the driver of the oncoming vehicle. Thus in the specific case where the image of a light source (e.g. the headlamps of an oncoming vehicle) is formed at the extreme end of the receiver aperture the projector aperture can remain fully closed because light still falls on the photo cell 22 to hold the shutters in the position wherein the projector aperture is closed.

I claim:

1. A road vehicle lighting system providing an improved illumination pattern, said system including, in combination;

first and second light sources;

first and second projector-receiver units, each unit including a light projector means for projecting forwardly a well-defined divergent beam of light of predetermined cross-section, a light receiver means for receiving light from an external source in front of said unit, and control means responsive to the light received by said receiver means from the external source for cutting off selected and sufficient portions of the projected beam of light starting and progressing from one side of said beam such that said projected beam does not fall on the external light source seen by said receiver means;

means for mounting said first light source and said first projector/receiver unit on the right of the front of the road vehicle, and said second light source and said second projector-receiver unit on the left of the front of the road vehicle; and wherein said control means of said first projector-receiver unit cuts off said projected beam of light associated therewith from the left side of said beam, said control means of said second projector-receiver unit cutting off said projected beam of light associated therewith from the right side of said beam.

2. A system as claimed in claim 1 wherein said first and second projector-receiver units are mounted by said mounting means so that the optical axes of their respective projected beams diverge slightly from the longitudinal centre line of the road vehicle, with said beams overlapping at their maximum width.

3. A system as claimed in claim 2 wherein the optical axes of said respective projected beams diverge 2° from the centre line of the road vehicle, each beam having an 11° lateral spread so that the field of the two beams is 15°.

4. A system as claims in claim 1 wherein said first projector-receiver unit and said first light source are mounted side by side with the light source adjacent the right side of the vehicle, and wherein said second light source and said second projector-receiver unit are mounted side by side with the light source adjacent the left side of the vehicle.

* * * * *